UNITED STATES PATENT OFFICE.

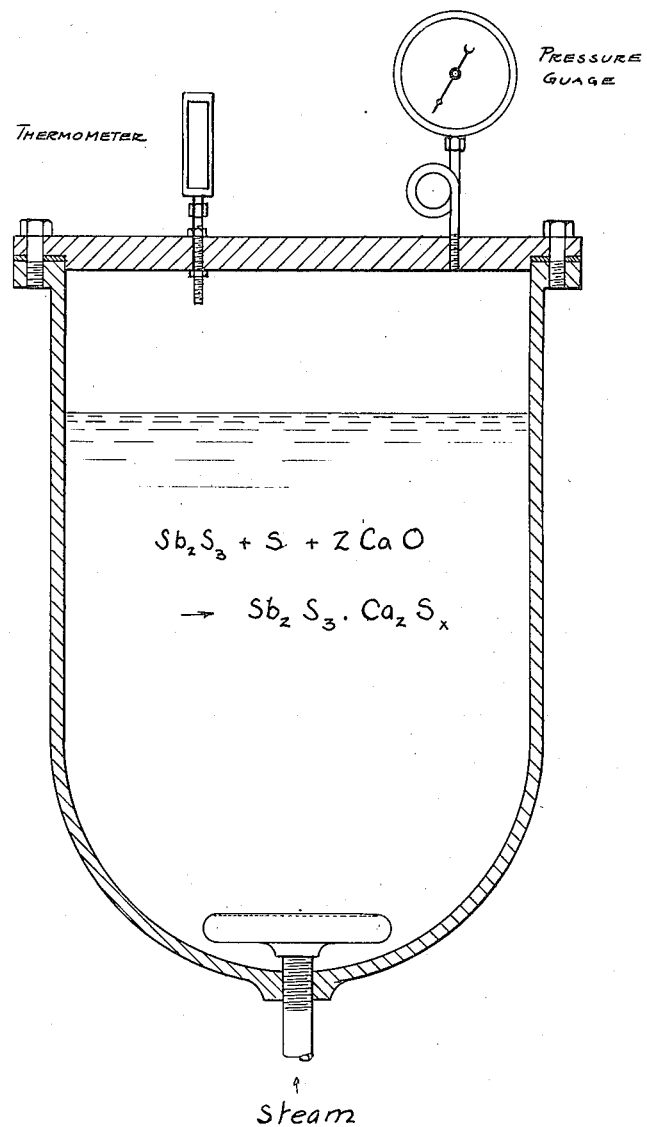

ARTHUR L. STARK, OF ELYRIA, OHIO, ASSIGNOR TO THE STIBIUM PRODUCTS COMPANY, OF ELYRIA, OHIO, A CORPORATION OF OHIO.

METHOD OF MAKING PRECIPITATED ANTIMONY SULPHIDE.

1,414,836.      Specification of Letters Patent.      Patented May 2, 1922.

Application filed November 12, 1919. Serial No. 337,408.

*To all whom it may concern:*

Be it known that I, ARTHUR L. STARK, a citizen of the United States, and a resident of Elyria, county of Lorain, and State of Ohio, have invented a new and useful Improvement in Methods of Making Precipitated Antimony Sulphide, of which the following is a specification, the principle of the invention being herein explained and the best mode in which I have contemplated applying that principle, so as to distinguish it from other inventions.

The present invention relates more particularly to the production of antimonic sulphide or pentasulphide ($Sb_2S_5$), or a mixture of such pentasulphide with antimonous phide or pentasulphide ($Sb_2S_5$), or a mixuse for vulcanizing and imparting a red color to rubber or caoutchouc. As is well known, the pentasulphide forms an orange red powder, which is readily soluble in alkali sulphides and decomposes into the trisulphide and sulphur on heating.

As in the production of metallic antimony, so, for the manufacture of the compound in hand which is known in the trade as antimony sulphurette, the commercially available form of raw material is stibnite or needle antimony, which is derived from the naturally occurring gray antimony ore, and consists essentially of the trisulphide. The ore in question is first liquated or melted in such a manner as to separate the sulphide from the rocky matter associated with it, and the object of the present invention is to provide an improved process for the conversion of this material into the desired product with a minimum of waste. At the same time the product is secured in a finely divided form that renders it especially suitable for the intended use.

To the accomplishment of the foregoing and related ends, the invention, then, consists of the steps hereinafter fully described and particularly pointed out in the claims, the annexed drawing and the following description disclosing but one of several ways in which the principle of the invention may be carried out.

In said annexed drawing:—

The single figure there appearing is a more or less diagrammatic representation of an apparatus suitable for carrying out my present improved process.

As previously indicated, the material utilized as the starting point for the present method or process consists of the crude trisulphide or stibnite. This is first ground to a fine impalpable powder. Thereupon quick lime (CaO) and sulphur, both in powdered form, are added. The ingredients are thoroughly intermixed and gradually moistened with water until a pasty or slightly fluid mass is formed, it being understood of course that the quick lime immediately upon coming into contact with such water will be converted into calcium hydrate and that if desired such hydrate may be directly admixed with the other ingredients named above. The term "lime" will accordingly be employed herein to designate either such calcium oxide or hydrate. Thereupon a quantity of the mixture thus prepared is placed with more water in an autoclave and boiled under pressure at a high temperature, the boiling being accomplished by injecting steam at the bottom of such autoclave. The steam not only serves to bring the mixture to the desired temperature, but to agitate the same as well, where the autoclave is of the vertical type illustrated, without it being necessary to employ a mechanical agitator. The treatment in question is continued until substantially all of the solid constituents have been converted into the double antimony-calcium sulphide ($Sb_2S_3.Ca_2S_x$) which is soluble in water.

The solution thus obtained is then removed and, upon addition to a suitable acid, either hydrochloric or sulphuric acid, the desired antimony sulphide or sulphurette, consisting principally, if not altogether, of the pentasulphide, is precipitated out in the form of a very fine impalpable powder.

Assuming that relatively pure stibnite is being used, approximately equal parts of quick lime, sulphur and stibnite are employed, and in order to convert the mixture of the same into the water soluble double sulphide, the treatment in the autoclave is conducted under a pressure of approximately 60 to 80 pounds, and at a temperature of approximately 145 to 155 degrees. C. By my improved process not only is a more complete absorption of the raw materials, i. e. of the stibnite, sulphur and quick lime, secured, so that very little of such material is lost in the form of sludge, but the conversion takes place very rapidly. By thus requiring a relatively small amount of material to be in process, a marked economy is effected, at the same time that a superior product is obtained.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of making precipitated antimony sulphide, the steps which consist in mixing finely ground stibnite, sulphur and lime with water and heating under pressure at an elevated temperature, whereby a water-soluble double sulphide of antimony and calcium is obtained.

2. In a method of making precipitated antimony sulphide, the steps which consist in mixing finely ground stibnite, sulphur and quick-lime with sufficient water to form a paste, adding the resulting mixture to a body of water, and heating under pressure at an elevated temperature, whereby a water-soluble double sulphide of antimony and calcium is obtained.

3. In a method of making precipitated antimony sulphide, the steps which consist in mixing finely ground stibnite, sulphur and quick-lime with sufficient water to form a paste, adding the resulting mixture to a body of water, and heating under a pressure of approximately 60 to 80 pounds and a temperature of approximately 145 to 155 degrees C., whereby a water-soluble double sulphide is obtained.

4. In a method of making precipitated antimony sulphide, the steps which consist in mixing finely ground stibnite, sulphur and quick-lime with sufficient water to form a paste, adding the resulting mixture to a body of water in an autoclave, and then injecting steam into such autoclave so as to agitate and heat the mixture and water, whereby a water-soluble double sulphide is obtained.

5. In a method of making precipitated antimony sulphide, the steps which consist in mixing finely ground stibnite, sulphur and quick-lime with sufficient water to form a paste, adding the resulting mixture to a body of water in an autoclave, and then injecting steam into such autoclave so as to agitate and heat the mixture and water to a temperature of approximately 145 to 155 degrees C. under a pressure of approximately 60 to 80 pounds, whereby a water-soluble double sulphide is obtained.

6. In a method of making precipitated antimony sulphide, the steps which consist in mixing finely ground stibnite, sulphur and quick-lime with sufficient water to form a paste, adding the resulting mixture to a body of water, heating under pressure at an elevated temperature, whereby a water-soluble double sulphide of antimony and calcium is obtained, and then adding a suitable acid, whereby antimony pentasulphide is precipitated.

Signed by me, this 5th day of November, 1919.

ARTHUR L. STARK.